United States Patent
Ahmed et al.

(12)

(10) Patent No.: US 6,232,415 B1
(45) Date of Patent: May 15, 2001

(54) PROCESS TO PRODUCE A MONOVINYLAROMATIC/ MONOOLEFIN POLYMER AND SAID MONOVINYLAROMATIC/MONOOLEFIN POLYMER

(75) Inventors: Iqbal Ahmed; Jianxin Kuang; George A. Moczygemba; M. Bruce Welch; Syriac J. Palackal, all of Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 0 days.

(21) Appl. No.: 09/282,528

(22) Filed: Mar. 31, 1999

(51) Int. Cl.⁷ ............................ C08F 4/16; C08F 112/08; C08F 112/12; C08F 212/08; C08F 212/02
(52) U.S. Cl. ...................... 526/160; 526/347; 526/347.1; 526/347.2; 526/348.3; 526/943; 502/152
(58) Field of Search ..................................... 526/160, 161, 526/943, 346, 347, 347.2, 348.6, 69

(56) References Cited

U.S. PATENT DOCUMENTS

| | | | |
|---|---|---|---|
| 5,043,408 | 8/1991 | Kakugo et al. | 526/347 |
| 5,260,394 | 11/1993 | Tazaki et al. | 526/347 |
| 5,399,636 | 3/1995 | Alt et al. | 526/129 |
| 5,498,581 | 3/1996 | Welch et al. | 502/102 |
| 5,536,797 * | 7/1996 | Nickias et al. | 526/170 |
| 5,565,592 | 10/1996 | Patsidis et al. | 556/11 |
| 5,652,315 | 7/1997 | Inoue et al. | 526/153 |
| 5,703,187 | 12/1997 | Timmers | 526/282 |
| 5,830,958 * | 11/1998 | Peifer et al. | 526/113 |
| 5,869,591 * | 2/1999 | McKay et al. | 526/347 |
| 6,057,410 * | 5/2000 | Alt et al. | 526/308 |

\* cited by examiner

Primary Examiner—David W. Wu
Assistant Examiner—R. Harlan
(74) Attorney, Agent, or Firm—Edward L. Bowman

(57) ABSTRACT

A process to produce a monovinylaromatic/monoolefin polymer is provided. Said monovinylaromatic/monoolefin polymer is provided.

10 Claims, No Drawings

US 6,232,415 B1

PROCESS TO PRODUCE A MONOVINYLAROMATIC/ MONOOLEFIN POLYMER AND SAID MONOVINYLAROMATIC/MONOOLEFIN POLYMER

FIELD OF THE INVENTION

This invention is related to the field of polymers.

BACKGROUND OF THE INVENTION

One of the most important processes for the production of homopolymers of ethylene or copolymers of ethylene/monoolefin is called the slurry polymerization process. Usually, this process employs a diluent, such as, for example, isobutane. However, while this process is very versatile in producing these polymers, it has long been desirable to produce other polymers using this process. This is because of the cost saving that can be realized by utilizing the same commercial operating equipment to produce different polymers.

The invention herein is a step towards this direction.

SUMMARY OF THE INVENTION

It is an object of this invention to provide a process to produce a monovinylaromatic/monoolefin polymer.

It is another object of this invention to provide a monovinylaromatic/monoolefin polymer.

In accordance with this invention a process to produce a monovinylaromatic/monoolefin polymer is provided. Said process comprises polymerizing at least one monovinylaromatic and at least one monoolefin to form a monovinylaromatic/monoolefin polymer, wherein said polymerizing:

(1) is conducted using at least one M-catalyst;
(2) is conducted under polymerization conditions, where said polymerization conditions comprise a temperature from about 0° C. to about 300° C. and a pressure from about 100 kPa to about 10000 kPa;
(3) is conducted in a polymerization zone; and
(4) is conducted in the presence of isobutane.

In accordance with this invention a monovinylaromatic/monoolefin polymer is provided. Said monovinylaromatic/monoolefin polymer is produced by said process.

These objects and other objects of this invention are further disclosed in the following.

DETAILED DESCRIPTION OF THE INVENTION

The monovinylaromatic monomers that can be used in this invention contain from about 8 to about 20 carbon atoms. However, it is more preferred when these monomers contain about 8 to about 12 carbon atoms. Suitable examples of such monomers are styrene, alpha-methyl styrene, 2-methylstyrene, 3-methylstyrene, 4-methylstyrene, 2-ethylstyrene, 3 -ethylstyrene, 4-ethylstyrene, 4-n-propylstyrene, 2-t-butylstyrene, 2,4-dimethylstyrene, and 4-cyclohexylstyrene. Styrene is currently most preferred.

The monoolefin monomers that can be used in this invention contain from about 2 to about 20 carbon atoms. However, it is more preferred when these monomers contain about 2 to about 10 carbon atoms. It is most preferred when these monomers have 2 to 6 carbon atoms. Suitable examples of such monomers are ethylene, propylene, butene, pentene, and hexene. Ethylene is currently most preferred.

These monomers are polymerized using at least one M-catalyst. For the purposes of this invention M-catalyst is defined as those catalysts disclosed in U.S. Pat. No. 5,498,581, where said catalysts are made by the claimed methods. This patent is entitled "METHOD FOR MAKING AND USING A SUPPORTED METALLOCENE CATALYST SYSTEM" and issued on Mar. 12, 1996. The entire disclosure of U.S. Pat. No. 5,498,581, is hereby incorporated by reference. A suitable, and preferred, metallocene to use to produce the M-catalyst is ((9-fluorenyl) (cyclopentadienyl) (methyl) (3-butenyl) methane) zirconium dichloride.

The polymerizing is conducted under polymerization conditions. These polymerization conditions comprises a temperature and a pressure.

The temperature is from about 0° C. to about 300° C. However, it is more preferred when the temperature is from about 20° C. to about 200° C. and it is most preferred when the temperature is from 50° C. to 112° C.

The pressure is from about 100 kPa to about 10000 kPa. However, it is more preferred when the pressure is from about 500 kPa to about 6000 kPa and it is most preferred when the pressure is from 500 kPa to 5000 kPa.

The polymerizing is conducted in a polymerization zone. Currently, any reactor can be used for this polymerization. However, it is more preferred to use a loop slurry reactor. This reactors are well known in the polyethylene polymerization art.

It is most desirable to conduct the polymerization in the presence of isobutane which is the diluent in a slurry polymerization.

The monovinylaromatic/monoolefin polymer produced by this process comprises about 0.1 to about 90 weight percent polymerized monovinylaromatic based on the weight of the monovinylaromatic/monoolefin polymer. However, it is more preferred when the monovinylaromatic/monoolefin polymer produced by this process comprises about 0.5 to about 80 weight percent polymerized monovinylaromatic based on the weight of the monovinylaromatic/monoolefin polymer and it is most preferred when the monovinylaromatic/monoolefin polymer produced by this process comprises 1 to 80 weight percent polymerized monovinylaromatic based on the weight of the monovinylaromatic/monoolefin polymer.

The monovinylaromatic/monoolefin polymer produced by this process comprises about 10 to about 99.9 weight percent polymerized monoolefin based on the weight of the monovinylaromatic/monoolefin polymer. However, it is more preferred when the monovinylaromatic/monoolefin polymer produced by this process comprises about 20 to about 99.5 weight percent polymerized monoolefin based on the weight of the monovinylaromatic/monoolefin polymer and it is most preferred when the monovinylaromatic/monoolefin polymer produced by this process comprises 20 to 99 weight percent polymerized monoolefin based on the weight of the monovinylaromatic/monoolefin polymer.

EXAMPLES

Comparative Example One

In this comparative example, (5-cyclopentadienyl)(5-fluorenyl)hex-1-ene zirconium dichloride does not polymerize styrene in cyclohexane.

(1) 700 grams of cyclohexane was added to a reactor and then the isobutane was heated to 60° C.
(2) 110 grams of styrene was then added to the reactor followed by 0.6 milliliters of triisobutyl aluminum to form a first mixture.

(3) 16 milliliters of a 10 weight percent mixture of methylaluminoxane in toluene was then added to the reactor to form a second mixture.

(4) 0.016 grams of (5-cyclopentadienyl)(5-fluorenyl)hex-1-ene zirconium dichloride indenyl titanium trichloride in 30 milliliters of methylaluminoxane was then added to the reactor to form a third mixture.

No polymer formed.

Comparative Example Two

In this comparative example, InTiCl₃ does not copolymerize styrene and ethylene in isobutane.

(1) 300 milliliters of isobutane was added to a reactor and then the isobutane was heated to 70° C.

(2) 72.5 grams of styrene was then added to the reactor to form a first mixture.

(3) 15 milliliters of a 10 weight percent mixture of methylaluminoxane in toluene was then added to the reactor to form a second mixture.

(4) 0.010 grams of indenyl titanium trichloride in 14 milliliters of methylaluminoxane was then added to the reactor to form a third mixture.

(5) 450 psig of ethylene was used and this pressure was maintained during the polymerization, which lasted one hour.

A white, inhomogeneous product was obtained after washing. It had two melting peaks corresponding to polyethylene and syndiotactic polystyrene. The activity of the catalyst was 2400 grams of polymer per gram of catalyst.

Example One

In this example, styrene and ethylene are copolymerized as follows.

(1) 300 milliliters of isobutane was added to a reactor and then the isobutane was heated to 70° C.

(2) 10 grams of styrene was then added to the reactor to form a first mixture.

(3) 15 milliliters of a 10 weight percent mixture of methylaluminoxane in toluene was then added to the reactor to form a second mixture.

(4) 0.010 grams of (5-cyclopentadienyl)(5-fluorenyl)hex-1-ene zirconium dichloride in 15 milliliters of methylaluminoxane was then added to the reactor to form a third mixture.

(5) 450 psig of ethylene was used and this pressure was maintained during the polymerization, which lasted one hour.

A homogeneous, white, chunky fluff was obtained. It had a crystallization temperature of 89° C. The activity of the catalyst was 4850 grams of polymer per gram of catalyst.

Example Two

In this example, styrene and ethylene are copolymerized as follows.

(1) 300 milliliters of isobutane was added to a reactor and then the isobutane was heated to 70° C.

(2) 25 grams of styrene was then added to the reactor to form a first mixture.

(3) 15 milliliters of a 10 weight percent mixture of methylaluminoxane in toluene was then added to the reactor to form a second mixture.

(4) 0.010 grams of (5-cyclopentadienyl)(5-fluorenyl)hex-1-ene zirconium dichloride in 15 milliliters of methylaluminoxane was then added to the reactor to form a third mixture.

(5) 450 psig of ethylene was used and this pressure was maintained during the polymerization, which lasted one hour.

A homogeneous, white, chunky fluff was obtained. It had a crystallization temperature of 93° C. The activity of the catalyst was 4700 grams of polymer per gram of catalyst.

Example Three

In this example, styrene and ethylene are copolymerized as follows.

(1) 300 milliliters of isobutane was added to a reactor and then the isobutane was heated to 70° C.

(2) 40 grams of styrene was then added to the reactor to form a first mixture.

(3) 15 milliliters of a 10 weight percent mixture of methylaluminoxane in toluene was then added to the reactor to form a second mixture.

(4) 0.010 grams of (5-cyclopentadienyl)(5-fluorenyl)hex-1-ene zirconium dichloride in 15 milliliters of methylaluminoxane was then added to the reactor to form a third mixture.

(5) 450 psig of ethylene was used and this pressure was maintained during the polymerization, which lasted one hour.

A homogeneous, white, chunky fluff was obtained. It had a crystallization temperature of 93° C. The fluff had some styrene odor. The activity of the catalyst was 5030 grams of polymer per gram of catalyst.

Example Four

In this example, styrene and ethylene are copolymerized as follows.

(1) 300 milliliters of isobutane was added to a reactor and then the isobutane was heated to 70° C.

(2) 55 grams of styrene was then added to the reactor to form a first mixture.

(3) 15 milliliters of a 10 weight percent mixture of methylaluminoxane in toluene was then added to the reactor to form a second mixture.

(4) 0.010 grams of (5-cyclopentadienyl)(5-fluorenyl)hex-1-ene zirconium dichloride in 15 milliliters of methylaluminoxane was then added to the reactor to form a third mixture.

(5) 450 psig of ethylene was used and this pressure was maintained during the polymerization, which lasted one hour.

A homogeneous, off-white, soft rubbery solid was obtained. It had a crystallization temperature of 86° C. The solid had a strong styrene odor. The activity of the catalyst was 4060 grams of polymer per gram of catalyst.

That which is claimed is:

1. A process to produce a monovinyl aromatic/monoolefin copolymer comprising polymerizing at least one monovinyl monomer which contains about 8 to about 20 carbon atoms, and at least one monoolefin monomer which contains 2 to 20 carbon atoms under slurry polymerization conditions in the presence of a catalyst system comprising the metallocene (5-cyclopentadienyl) (5-fluorenyl) hex-1-ene zirconium dichloride and methylaluminoxane at a temperature in the range of from about 0° C. to about 300° C. and a pressure of about 100 kPa to about 10,000 kPa.

2. A process according to claim 1 wherein said monovinylaromatic monomer contains about 8 to about 12 carbon atoms.

3. A process according to claim 2 wherein said monoolefin monomer contains about 2 to about 10 carbon atoms.

4. A process according to claim 3 wherein said monoolefin monomer contains 2 to 6 carbon atoms.

5. A process according to claim 4 wherein said temperature is from about 20° C. to about 200° C.

6. A process according to claim 5 wherein said pressure is from about 500 kPA to about 6000 kPa.

7. A process according to claim 6 wherein said temperature is from 50° C. to 112° C.

8. A process according to claim 7 wherein said pressure is from 500 kPa to 5000 kPa.

9. A process according to claim 8 wherein said monovinylaromatic monomer is selected from the group consisting of styrene, alpha-methyl styrene, 2-methylstyrene, 3-methylstyrene, 4-methylstyrene, 2ethylstyrene, 3-ethylstyrene, 4-ethylstyrene, 4-n-propylstyrene, 2-t-butylstyrene, 2,4-dimethylstyrene, and 4-cyclohexylstyrene and where said monoolefin monomer is selected from the group consisting of ethylene, propylene, butene, pentene, and hexene.

10. A process according to claim 9 wherein said monovinylaromatic monomer is styrene and where said monoolefin monomer is ethylene.

* * * * *